(12) United States Patent
Takatori

(10) Patent No.: US 6,351,301 B1
(45) Date of Patent: Feb. 26, 2002

(54) SMECTIC LIQUID CRYSTAL WHICH ENABLES GRAYSCALE DISPLAY, AND LIQUID CRYSTAL USING THE SAME

(75) Inventor: Kenichi Takatori, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

(21) Appl. No.: 09/612,657

(22) Filed: Jul. 7, 2000

(30) Foreign Application Priority Data

Jul. 8, 1999  (JP) .......................................... 11-193871

(51) Int. Cl.$^7$ ............................................... C09K 19/02

(52) U.S. Cl. ....................................... 349/172; 349/184

(58) Field of Search ................................ 349/172, 184, 349/85, 49

(56) References Cited

U.S. PATENT DOCUMENTS

| | | | |
|---|---|---|---|
| 5,062,691 A | * 11/1991 | Tristani-Kendra et al. | 359/56 |
| 5,214,523 A | 5/1993 | Nito et al. | 359/100 |
| 5,676,880 A | 10/1997 | Beresnev et al. | 252/299.65 |
| 5,770,109 A | 6/1998 | Beresnev et al. | 252/299.65 |
| 5,877,834 A | 3/1999 | Sako et al. | 349/171 |

FOREIGN PATENT DOCUMENTS

| | | |
|---|---|---|
| JP | 1-152430 | 6/1989 |
| JP | 4-212126 | 8/1992 |
| JP | 6-194625 | 7/1994 |
| JP | 8-2532606 | 6/1996 |
| JP | 9-318921 | 12/1997 |
| JP | 10-41689 | 2/1998 |
| JP | 10-43839 | 2/1998 |
| JP | 10-65177 | 3/1998 |
| JP | 10-2849112 | 11/1998 |
| JP | 10-338877 | 12/1998 |

OTHER PUBLICATIONS

Y. Yamada et al., "Ferroelectric Liquid Crystal Display Using Tristable Switching", Jpn. J. Appl. Phys., vol. 29, pp. 1757–1764, 1990.

A.D.L. Chandani et al., "Antiferroelectric Chiral Smectic Phases ... in MHPOBC", Japanese J. of Applied Phys., vol. 28:7, 7/89, pp. L1265–1268.

N.A. Clark et al., "Submicrosecond bistable electro–optic switching in liquid crystals", App. Phys. Lett. vol. 36, 6/80, pp. 899–901.

Structures and Properties of Ferroelectric Liquid Crystals, pp. 240–241, (Corona Corp.), 1990.

H. Furue et al., "Fabrication of a Zigzag Defect–Free Surface ... Orientation Film", Jpn. J. Appl. Phys., vol. 37, pp. 3417–3421.

J.M. Geary, "A Multiplexed Ferroelectric LCD Using ac Field–Stabilized States", SID 85 Digest pp. 128–130.

B.I. Ostrovski et al., "Behavior of ferroelectric smectic liquid crystals in electric field", Advances Liquid Crystal Research and Apps., Oxford/Budapest 1980, pp. 469–482.

(List continued on next page.)

Primary Examiner—William L. Sikes
Assistant Examiner—Tarifur R. Chowdhury
(74) Attorney, Agent, or Firm—Foley & Lardner

(57) ABSTRACT

A liquid crystal display includes a liquid crystal layer. The liquid crystal layer includes a liquid crystal molecule. The liquid crystal molecule has a long axis, a short axis perpendicular to the long axis, a spontaneous polarization $P_s$ along the short axis, a first permittivity $\epsilon_{//}$ along the long molecular axis, and a second permittivity $\epsilon_\perp$ along the short axis. Here, the second permittivity $\epsilon_\perp$ is derived from polarizations other than the spontaneous polarization $P_s$. When a permittivity anisotropy $\Delta\epsilon$ defined as $\Delta\epsilon = \epsilon_{//} - \epsilon_\perp$, it holds $\Delta\epsilon < 0$. An orientation of the liquid crystal molecule is determined by an effective electric field which is a sum of an exterior electric field applied to the liquid crystal layer and a depolarization field generated by the spontaneous polarization.

22 Claims, 7 Drawing Sheets

OTHER PUBLICATIONS

H. Furue et al., "Mesogenic Polymer Stabilized Ferroelectric . . . Grayscale Capability", Jpn. J. Appl. Phys. vol. 36, 1997, pp. L1517–L1519.

S. Inui et al., "Thresholdless Antiferroelectricity in Liquid Crystals", Preliminary Lecture Manuscript of 21–th Liquid Crystal Meeting, pp. 223–223, (1995).

A. Mochizuiki et al., "Gray shades capability of SSFLCs by using a bookshelf layer structure FLC", 1996, International Workshop on Active–Matrix Liquid Crystal Displays, Nov. 27–29, 1996, Kobe, Japan.

P.W. Ross et al., "Color Digital Ferroelectric LCDs for Laptop Applications", SID 92 Digest, pp. 217–220.

T. Salshu et al., "Voltage–Holding Properties of Thresholdless Antiferroelectric Liquid Crystals Driven by Active Matrices", SID 96 Digest, pp. 703–706.

P.W. Surguy et al., "The Joers/Alvey Ferroelectric Multiplexing Scheme", Ferroelectric, 122, pp. 63–79, 1991.

C. Tanaka et al., "An Antiferroelectronic Liquid Crystal with a Novel Hysteresis Loop", Preliminary Lecture Manuscript of a 21–th Liquid Crystal Meeting, pp. 250–251, 1995.

M. Terada et al., "Half V–shaped Switchiing mode FLCD", Extended Abstracts of the $46^{th}$ Spring Meeting, p. 1316, 1999.

* cited by examiner

SMECTIC LIQUID CRYSTAL WHICH ENABLES GRAYSCALE DISPLAY, AND LIQUID CRYSTAL USING THE SAME

BACKGROUND OF THE INVENTION

1. Field of the Invention

The present invention relates to a smectic liquid crystal and a liquid crystal display using the same. More particularly, the present invention relates to a smectic ferroelectric liquid crystal which enables grayscale display, and a liquid crystal display using the same.

2. Description of the Related Art

A liquid crystal display using a surface stabilized ferroelectric liquid crystal (SSFLC) is proposed as a liquid crystal display in which a wide viewing angle and a quick response can be expected. Such a liquid crystal display is disclosed in "Submicrosecond bistable electro-optic switching in liquid crystals", N. A. Clark et al., Appl. Phys. Lett., 36, pp.899–901 (1980). The SSFLC has a spontaneous polarization which is inverted by the application of an external electric field. This inversion causes a direction of a liquid crystal molecule in the SSFLC to be switched. Two states of a bright state and a dark state are generated depending on the direction of the liquid crystal molecule in the SSFLC.

However, the SSFLC is bi-stable. The SSFLC display has the only two states of the bright state and the dark state. Thus, conventionally, the SSFLC liquid crystal display has a problem that the grayscale display is difficult.

A method for driving the SSFLC by using an AC stabilization effect is disclosed in "A Multiplexed Ferroelectric LCD Using ac Field-Stabilized States", J. M. Geary, SID 85 Digest, pp.128–130. Also, a SSFLC display using the $\tau$–$V_{min}$ drive method is disclosed in "The 'Joers/Alvey' Ferroelectric Multiplexing Scheme", P. W. H.Surguy et al., Ferroelectric, 122, pp.63–79 (1991), "Color Digital Ferroelectric LCDs for Laptop Applications", P. W.Ross et al., SID 92 Digest, pp.217–220 (1992), and Japanese Laid Open Patent Application (JP-A-Heisei 9-318921). However, the problem can not be solved by the drive method for driving the SSFLC by using the AC stabilization effect or the $\tau$–$V_{min}$ drive method.

Therefore, a dithering method for spatially dividing pixels, a field cutting method of time-divisionally generating graylevels and an area gradation method for controlling a generation degree of a polarization inversion area within a pixel are frequently used for achieving grayscale display. However, those methods have a problem that a circuit for driving a liquid crystal is complex.

Moreover, the conventional SSFLC is hard to be driven by a TFT(Thin Film Transistor) because of its large spontaneous polarization. Thus, the liquid crystal display using the SSFLC should be driven by a simple matrix drive. However, it is difficult for the simple matrix drive to attain the liquid crystal display having a high resolution and a high image quality.

On the other hand, as the liquid crystal display in which grayscale display is achieved, a liquid crystal display which uses anti-ferroelectric liquid crystal material is disclosed in "Ferroelectric Liquid Crystal Display Using Tristable Switching", Y. Yamada et al., Jpn. J. Appl. Phys., 29, pp.1757–1764 (1990) and "Antiferroeletctric Chiral Smectic Phases Responsible for the Tristable Switching in MHPOBC", A. D. L. Chandani et al., Jpn. J. Appl. Phys., 28, pp.L1265–L1268(1989). The anti-ferroelectric liquid crystal material has a tri-stable property. A liquid crystal display making use of switching the anti-ferroelectric liquid crystal material under an application of a bias voltage achieves grayscale display under an application of a bias voltage.

However, the liquid crystal display using the anti-ferroelectric liquid crystal material has a problem that the bias voltage is necessary for the grayscale display and that a drive wave form is complex in a case of a display element having a high resolution and many scan lines. Moreover, in the conventional liquid crystal display using the anti-ferroelectric liquid crystal material, it is difficult to carry out a TFT drive because of a large value of a spontaneous polarization of the anti-ferroelectric liquid crystal material.

Moreover, as a ferroelectric liquid crystal display in which grayscale display can be done, a liquid crystal display device using a deformed helix ferroelectric (DHF) liquid crystal is disclosed in "Behaviour of ferroelectric smectic liquid crystals in electric field", Ostrovski et al., Advances in Liquid Crystal Research and Applications, Oxford/Budapest (1980) pp.469–482 and Japanese Laid Open Patent Application (JP-A-Heisei, 1-152430). As shown in FIG. 1, in the liquid crystal display using the DHF liquid crystal, a distance $d_1$ between substrates 101, 102 is set to be longer than a pitch $d_2$ of a helix 104 formed by liquid crystal molecules 103 of the DHF liquid crystal. In the arrangement of the substrate 101, 102 and the liquid crystal molecules 104, the generation of the helix is never suppressed by surface stabilization. As a result, the liquid crystal molecules 103 are arrayed such that the helix is drawn in a direction parallel to the substrates 101, 102.

A diffraction grating is formed when the pitch $d_2$ of the helix 104 is within a wave length range of a light. The diffraction grating is not formed if the pitch $d_2$ of the helix 104 is set to be shorter than the wave length range of the visible light. The pitch $d_2$ of the helix 104 is typically set to be shorter than a half wave length ½$\lambda$. Apparent refractive indexes are averaged if the pitch $d_2$ of the helix 104 is set to be shorter than the wave length range of the light and thereby the diffraction grating is not formed. At this time, the DHF liquid crystal can be treated similarly to a medium having a uniaxial birefringence parallel to a helical axis.

That is, the DHF liquid crystal shows double refraction in a helix axis direction when a voltage is not applied. When the voltage is applied, the DHF liquid crystal is gradually deviated from the helix array in the liquid crystal orientation. Thus, it has the distorted helix structure, which causes a transmissivity to be changed. Hence, the DHF liquid crystal can carry out the continuous grayscale display. Its driving method is disclosed in Japanese Laid Open Patent Application (JP-A-Heisei, 6-194625). Moreover, another DHF liquid crystal is disclosed in Japanese Patent Office Gazette (Jp-B 2532606).

Also, a polymer stabilized FLC (ferroelectric liquid crystal) is known as a ferroelectric liquid crystal material which can attain the continuous grayscale display. The polymer stabilized FLC is disclosed in "Mesogenic Polymer Stabilized Ferroelectric Liquid Crystal Display Exhibiting Monostability with High Contrast Ratio and Grayscale Capability", H.Furue et al., Jpn. J. Appl. Phys., 36, pp.L1517–L1519 (1997) and "Fabrication of a Zigzag Defect-Free Surface-Stabilized Ferroelectric Liquid Crystal Display Using Polyimide Orientation Film", H. Furue, et al., Jpn. J. Appl. Phys., 37, pp.3417–3421(1998). The polymer stabilized FLC liquid crystal includes monomer together with the FLC (Ferroelectric Liquid Crystal) material. The polymer stabilized FLC is stabilized by irradiating an ultraviolet light while aligning the liquid crystal molecules in one direction through the application of electric field. The continuous grayscale display can be done in the polymer stabilized FLC liquid crystal. FIG. 2 shows a voltage-to-contrast ratio curve in this polymer stabilized FLC measured at four temperatures (25° C., 30° C., 35° C. and 40° C.). The contrast ratio is a ratio of the transmissivity to 0V at the darkest time, and substantially corresponds to a voltage transmissivity curve. As shown in FIG. 3, the transmissivity is gradually changed. The continuous grayscale display can be obtained in the polymer stabilized FLC display.

Also, another liquid crystal display which can attain the continuous grayscale display is disclosed in Japanese Laid Open Patent Application (JP-A-Heisei, 4-212126). In this liquid crystal display, two substrates are arranged such that the orientations are substantially parallel to each other. Projection components to the substrate of a molecule axis of liquid crystal molecules of a ferroelectric liquid crystal having a chiral-smectic C phase and projection components to the substrates in an axis direction of cones drawn by the liquid crystal molecules are respectively equal to orientation process directions. This state is mono-stabilized as an initial state, namely, set at a mono-stabilized state. In this liquid crystal display, the liquid crystal orientation is mono-stabilized on a top surface or a bottom surface on the cone when the voltage is not applied. The orientation is changed, and the transmissivity is increased, depending on the positively or negatively electric field. This change is continuously generated in accordance with the magnitude of the electric field. Thus, the continuous gradation can be attained in this device.

Moreover, another ferroelectric liquid crystal display which can attain the continuous grayscale display is disclosed in "Half V-shaped switching mode FLCD", M. Terada et al., Extended Abstracts of The 46th Spring Meeting, p.1316 (1999). The ferroelectric liquid crystal display employs a mono-stable FLC having a Half V-shaped switching mode. This mono-stable FLC is formed by performing a Ch-Smc* phase transition while applying a voltage to the FLC material having the Iso. (isotropic phase)—Ch (cholesteric, namely, chiral nematic N*)—SmC* (chiral-smectic C) phase transition. The fact that such a method enables the mono-stabilization is disclosed in "Structure And Properties of Ferroelectric Liquid Crystal", pp. 240–241 (Corona Corporation, 1990). The mono-stable FLC having the Half-V-shaped switching mode has the correspondence in which a brightness is changed only by one polarity of a voltage.

Moreover, a liquid crystal display which can attain the grayscale display by using a chevron bookshelf structure is disclosed in Japanese Patent Office Gazette (Jp-B 2849112) and "Gray shades capability of SSFLCs by using a bookshelf layer structure FLC", A. Mochizuki et al., Digests of IDW'96 Vol.1, pp.69–72 (1996). Also, a smectic liquid crystal material in which a curve of a light transmissivity to an application voltage indicates a V-shaped curve having a minimum value at 0V is disclosed in "Thresholdless Antiferroelectricity in Liquid Crystals", S.Inui et al., Preliminary Lecture Manuscript of 21-th Liquid Crystal Meeting, p.222–223 (1995), "An Antiferroelectronic Liquid Crystal with a Novel Hysteresis loop", C. Tanaka et al., Preliminary Lecture Manuscript of 21-th Liquid Crystal Meeting, pp.250–251 (1995), and "Voltage-Holding Properties of Thresholdless Antiferroelectric Liquid Crystals Driven by Active Matrices", T. Saishu et al. , SID 96 Digest, pp.703–706 (1996).

However, the conventional ferroelectric liquid crystal displays which can attain the grayscale display as mentioned above have the large values of the spontaneous polarization. Therefore, the TFT drive is difficult. Thus, it is necessary that the conventional ferroelectric liquid crystal displays which can attain the grayscale display are driven by the simple matrix drive. Hence, it is difficult that the conventional ferroelectric liquid crystal displays which can attain the grayscale display achieve the liquid crystal display with the high resolution and the high image quality. This is because in the simple matrix drive, the number of scan lines is limited and the contrast is limited.

In order to solve those problems, we discloses a liquid crystal material having a low spontaneous polarization in which the TFT drive can be done and a liquid crystal display using the same in Japanese Laid Open Patent Application (JP-A-Heisei, 10-338877).

Moreover, the conventional ferroelectric liquid crystal displays which can attain the conventional grayscale display have a problem of requiring a reset drive and a drive using a calculation between frames. This is because while a voltage is retained in the liquid crystal by an accumulation capacitor since the TFT is turned OFF, its retained voltage is varied by the inversion of the spontaneous polarization to thereby induce a response referred to as a step response. Therefore, the reset drive and the drive using the calculation between the frames are required in order to prevent the step response from being induced.

The reset drive and the drive using the calculation between the frames are described in detail in Japanese Laid Open Patent Application (JP-A-Heisei, 10-41689) and Japanese Laid Open Patent Application (JP-A-Heisei, 10-43839) in relation to the application of the present applicant. Also, Japanese Laid Open Patent Application (JP-A-Heisei, 10-65177) filed by the present applicant discloses a technique for writing one frame or a plurality of frames to one field as a method which does not use the reset drive and the calculation between the frames. However, even this method has a problem that signals having a high frequency are needed in the liquid crystal display. As mentioned above, the reset drive and the drive using the calculation between the frames are required, and the drive frequency is increased.

SUMMARY OF THE INVENTION

Therefore, an object of the present invention is to provide a smectic liquid crystal material which can attain a grayscale display and a liquid crystal display using the same;

Another object of the present invention is to provide a smectic liquid crystal material having a low drive voltage which can attain the grayscale display, and a liquid crystal display using the same;

Still another object of the present invention is to provide a smectic liquid crystal material having a low drive frequency which can attain the grayscale display, and a liquid crystal display using the same;

Yet still another object of the present invention is to provide a liquid crystal display having a high image quality which can attain the grayscale display;

It is also an object of the present invention to provide an active matrix type liquid crystal display having a high image quality which can attain the grayscale display;

It is another object of the present invention to provide an active matrix type liquid crystal display which can attain the grayscale display and have a high image quality, a low drive voltage and a low drive frequency; and It is still another object of the present invention to provide an active matrix type liquid crystal display which can attain the grayscale display without requiring the reset drive and the calculation between the frames.

In order to achieve an aspect of the present invention, a liquid crystal display includes a liquid crystal layer including a liquid crystal molecule. The liquid crystal molecule has a long axis, a short axis perpendicular to the long axis, a spontaneous polarization $P_s$ along the short axis, a first permittivity $\epsilon_{//}$ along the long molecular axis, a second permittivity $\epsilon_\perp$ along the short axis. The second permittivity $\epsilon_\perp$ is derived from polarizations other than the spontaneous polarization. When a permittivity anisotropy $\Delta\epsilon$ is defined as $$\Delta\epsilon = \epsilon_{//} - \epsilon_\perp,$$

the permittivity anisotropy $\Delta\epsilon$ has a value of $$\Delta\epsilon < 0.$$

And an orientation of the liquid crystal molecule is determined by an effective electric field. The effective electric field is a sum of an exterior electric field applied to the liquid crystal layer and a depolarization field generated by the spontaneous polarization.

The liquid crystal display may further include a first pair of electrodes between which the liquid crystal layer is located. The first pair of electrodes and the liquid crystal layer constitute a liquid crystal cell. In this case, the spontaneous polarization $P_s$ is determined as $$\Delta V < V_{cc}/2n,$$

where $\Delta V$ is a change in a voltage between the first pair of electrodes caused by a reverse of the spontaneous polarization $P_s$ after charging of the first pair of electrodes to a charging voltage is finished, and $V_{cc}$ is a maximum driving voltage applied to the first pair of electrodes, and n is a number of graylevels of the liquid crystal display.

The liquid crystal display may further include a storage capacitor. The storage capacitor includes a second pair of electrodes and a insulating layer between the second pair of electrodes and is connected to the liquid crystal cell in parallel. Desirably, the spontaneous polarization $P_s$ has a value of $$0 < P_s < \varepsilon_0 \left( \frac{\varepsilon_{lc}}{d_{lc}} + \frac{\varepsilon_{sc} \cdot k}{d_{sc}} \right) \cdot \frac{V_{cc}}{2n}$$

where $\epsilon_0$ is a permittivity of vacuum, and $\epsilon_{1c}$ is a permittivity of the liquid crystal layer in a same direction of the external electric field, $d_{1c}$ is a first distance between the pair of electrodes, and $\epsilon_{sc}$ is a permittivity of the insulating layer, and $d_{sc}$ is a second distance between the other pair of electrodes, and k has a value of $$k = S_{sc}/S_{1c}$$

where $S_{1c}$ is an aperture of each of the first pair of electrodes and $S_{sc}$ is an aperture of each of the second pair of electrodes.

It may be more desirable that the spontaneous polarization $P_s$ has a value of $$0 < P_s < \varepsilon_0 \left( \frac{\varepsilon_{lc}}{d_{lc}} + \frac{\varepsilon_{sc} \cdot k}{d_{sc}} \right) \cdot \frac{V_{cc}}{4n}.$$

With respect to the liquid crystal display, a first torque applied to the liquid crystal molecule and generated by coupling of a permittivity anisotropy of the liquid crystal molecule to the effective electric field is desirably larger than a second torque applied to the liquid crystal molecule and generated by coupling of the spontaneous polarization to the effective electric field.

The liquid crystal display may further include a first pair of electrodes between which the liquid crystal layer is located. The liquid crystal molecule lies on a surface of a cone having an apical angle of $2\theta$. One of ends of the liquid crystal molecule is fixed on a vertex of the cone and the other end of the liquid crystal is rotated along a circular base of the cone. A perpendicular from the vertex to the circular base is generally parallel to the pair of electrodes. In this case, the permittivity anisotropy $\Delta\epsilon$ desirably has a value of $$|\Delta\varepsilon| > \frac{P_s}{\varepsilon_0 \cdot \left( E + \frac{P_s \cos\phi}{\varepsilon_0 \varepsilon_{lc}} \right) \cdot \sin^2\theta \cdot \cos\phi}$$

where E is an amplitude of the exterior electric field, $\epsilon_{1c}$ is a permittivity of the liquid crystal layer in a same direction of the external electric field, $\phi$ is an azimuthal angle accomplished by a first segment and a second segment. The first segment is directed in a radius direction of the circular base and in parallel to the first pair of electrodes. The second segment links the other end of the liquid crystal molecule and a center of the circular base of the cone.

The liquid crystal display may further include a first pair of electrodes between which the liquid crystal layer is located. The liquid crystal layer may have a chevron structure including a plurality of smectic layers. The liquid crystal molecule lies on a surface of a cone having an apical angle of $2\theta$. One of ends of the liquid crystal molecule is fixed on a vertex of the cone and the other end of the liquid crystal is rotated along a circular base of the cone. A perpendicular from the vertex to the circular base is generally parallel to the pair of electrodes. In this case, the permittivity anisotropy $\Delta\epsilon$ desirably has a value of $$|\Delta\varepsilon| > \frac{P_s}{\varepsilon_0 \cdot \left( E + \frac{P_s \cos\phi}{\varepsilon_{lc}} \right) \cdot \left( \sin^2\theta \cdot \cos\delta \cdot \cos\phi + \frac{\sin 2\theta \cdot \sin\delta}{2\tan\phi} \right)}$$

where E is an amplitude of the exterior electric field, $\epsilon_{1c}$ is a permittivity of the liquid crystal layer in a same direction of the external electric field, $\phi$ is an azimuthal angle accomplished by a first segment and a second segment. The first segment is directed in a radius direction of the circular base and in parallel to the first pair of electrodes. The second segment links the other end of the liquid crystal molecule and a center of the circular base of the cone. $\delta$ is an angle accomplished by neighboring two of the plurality of smectic layers.

The liquid crystal layer may be formed of a smectic liquid crystal material which is a DHF(Deformed Helix Ferroelectric) liquid crystal material.

The liquid crystal layer may be formed of a smectic liquid crystal material which is a polymer stabilized ferroelectric liquid crystal material.

The liquid crystal display may further include a first pair of electrodes between which the liquid crystal layer is located. In this case, the liquid crystal layer may have a chiral-smectic C phase. The liquid crystal molecule may be mono-stabilized in an initial state such that a first projection component to the first pair of electrodes of the long axis and a second projection component to the first pair of electrodes of a rotation axis of a cone drawn by the liquid crystal molecule are respectively equal to a orientation process direction of the first pair of electrodes.

The liquid crystal layer may consist of a ferroelectric liquid crystal material having an isotropic phase, a chiral-smectic phase, and a smectic C* phase and mono-stabilized in an initial state while a phase transition from the chiral smectic phase to the smectic C* phase is done.

In order to achieve another aspect of the present invention, a method of operating a liquid crystal display cluding a liquid crystal molecule is composed of:

applying an external electric field to the liquid crystal molecule;

generating a depolarization field opposite to the electric field by reversing a spontaneous polarization of the liquid crystal molecule to produce an effective electric field which is sum of the external electric field and the depolarization field;

applying to the liquid crystal molecule a torque generated by a coupling of a permittivity anisotropy of the liquid crystal molecules to the effective electric field; and settling an orientation of the liquid crystal molecule, wherein the orientation is determined by an effective electric field.

In this case, the liquid crystal molecule desirably has a long axis, a short axis perpendicular to the long axis, a spontaneous polarization $P_s$ along the short axis, a first permittivity $\epsilon_{//}$ along the long molecular axis, a second permittivity $\epsilon_\perp$ along the short axis. The second permittivity $\epsilon_\perp$ is derived from polarizations other than the spontaneous polarization. Furthermore, it is desirable that a permittivity anisotropy factor $\Delta\epsilon$ defined as $\Delta\epsilon = \epsilon_{//} - \epsilon_\perp$ has a value of $$\Delta\epsilon < 0.$$

In order to achieve still another aspect of the invention, liquid crystal includes a liquid crystal molecule having a long axis, a short axis perpendicular to the long axis, a spontaneous polarization $P_s$ along the short axis, a first permittivity $\epsilon_{//}$ along the long molecular axis, and a second permittivity $\epsilon_\perp$ along the short axis. Here, the second permittivity is derived from polarizations other than the spontaneous polarization. A permittivity anisotropy $\Delta\epsilon$ defined as $$\Delta\epsilon = \epsilon_{//} - \epsilon_\perp$$

has a value of $\Delta\epsilon < 0$. A direction of the liquid crystal molecule is determined by an effective electric field which is a sum of an exterior electric field applied to the liquid crystal and a depolarization field caused by the spontaneous polarization.

DESCRIPTION OF THE PREFERRED EMBODIMENTS

A liquid crystal display according to the present invention will be described below with reference to the attached drawings.

Figure 1:
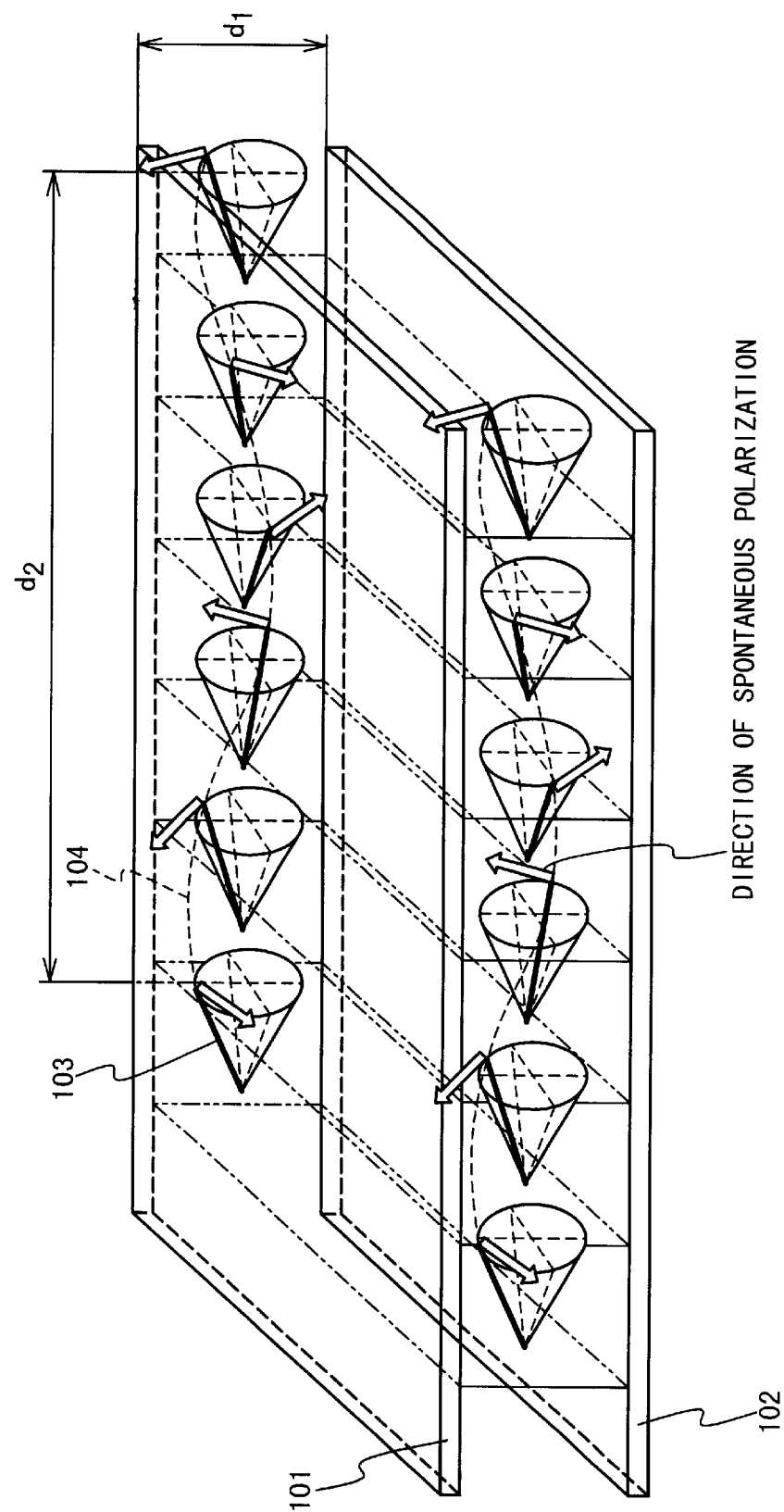
FIG. 1 shows a configuration of a conventional liquid crystal display.
Figure 2:
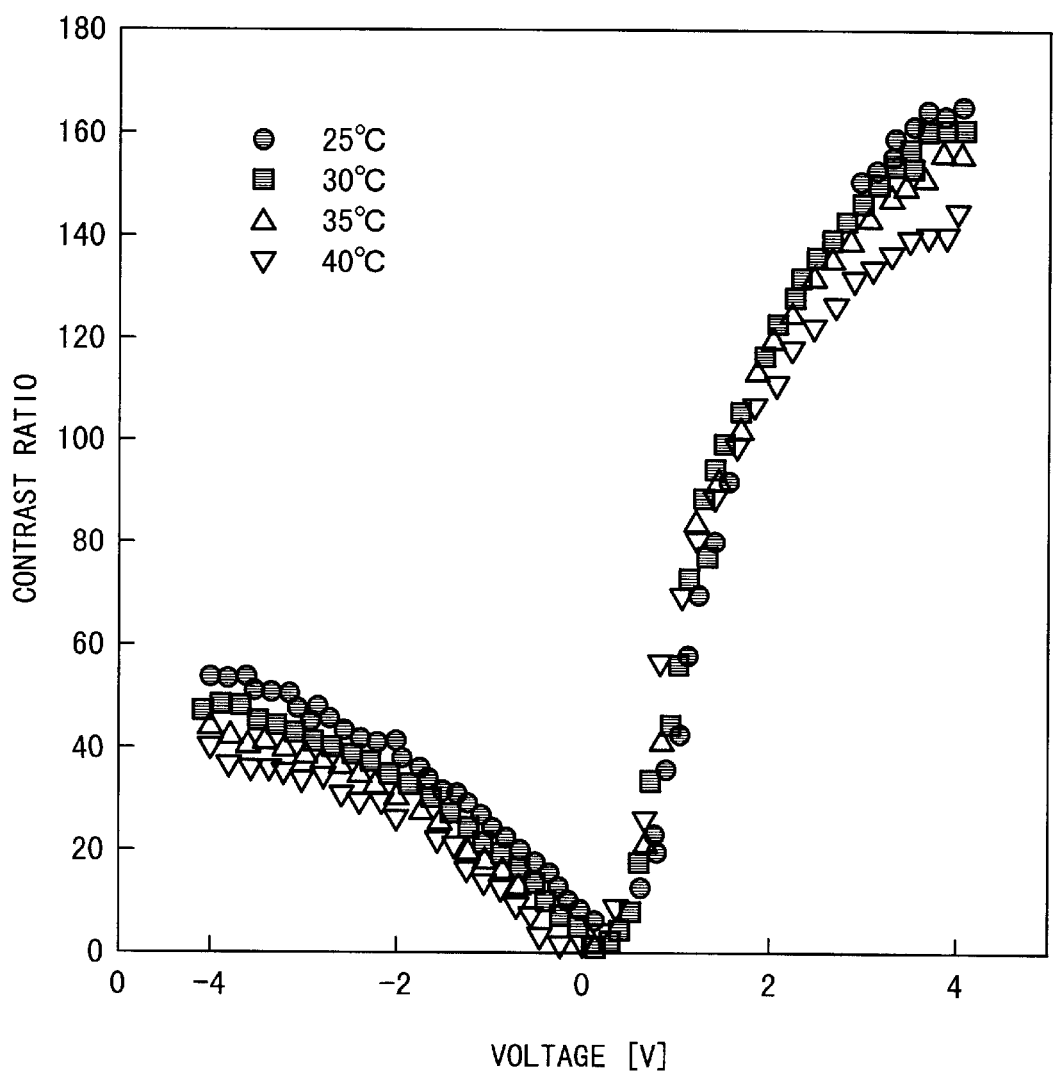
FIG. 2 shows a voltage-to-contrast ratio curve of a conventional polymer stabilization FLC.
Figure 3:
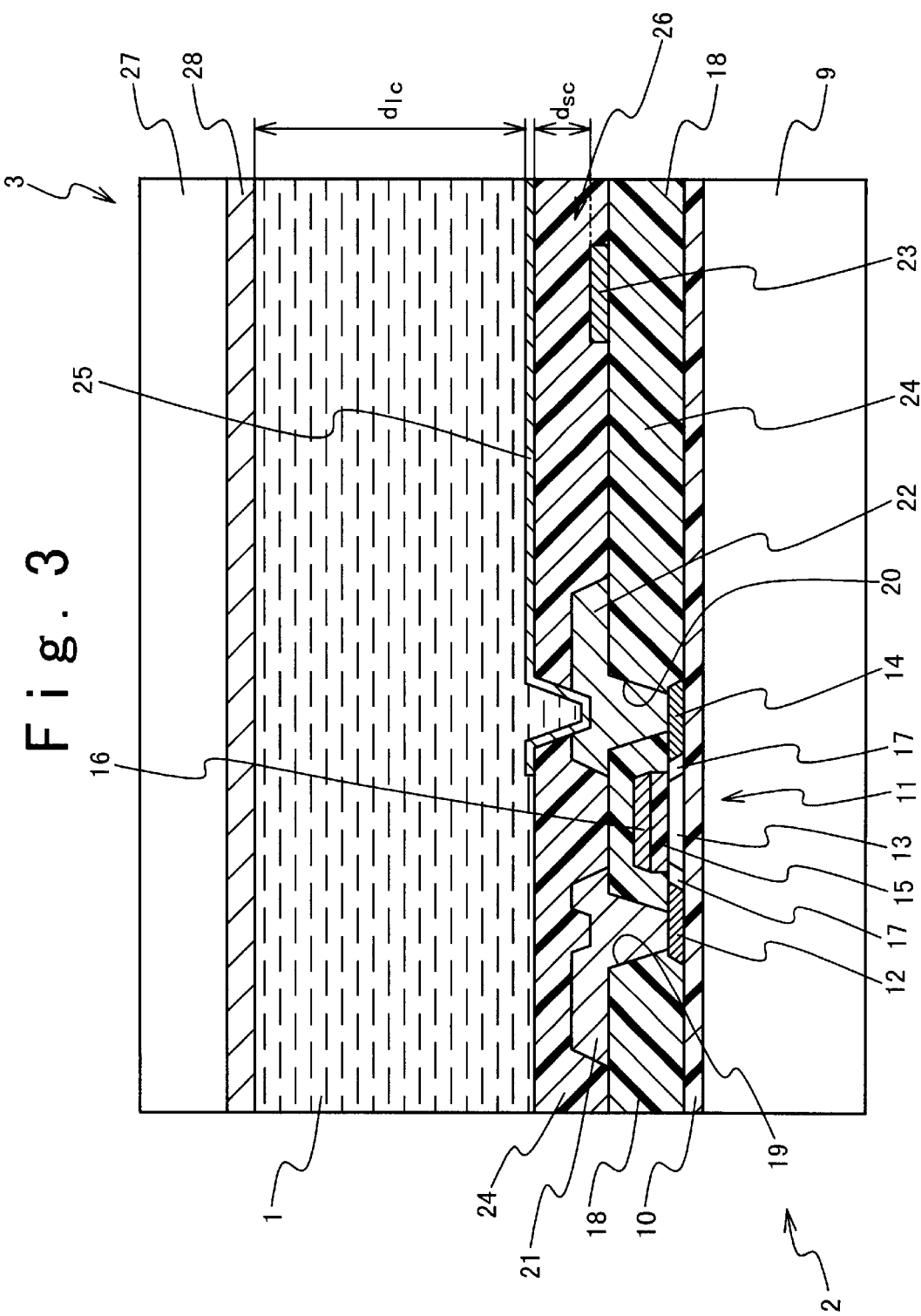
FIG. 3 shows a configuration of a liquid crystal display in an embodiment according to the present invention.

A liquid crystal display in an embodiment of the present invention is provided with a liquid crystal layer, a bottom substrate and a top substrate. The liquid crystal layer 1 is filled between a bottom substrate 2 and a top substrate 3, as shown in FIG. 3.

Figure 4:
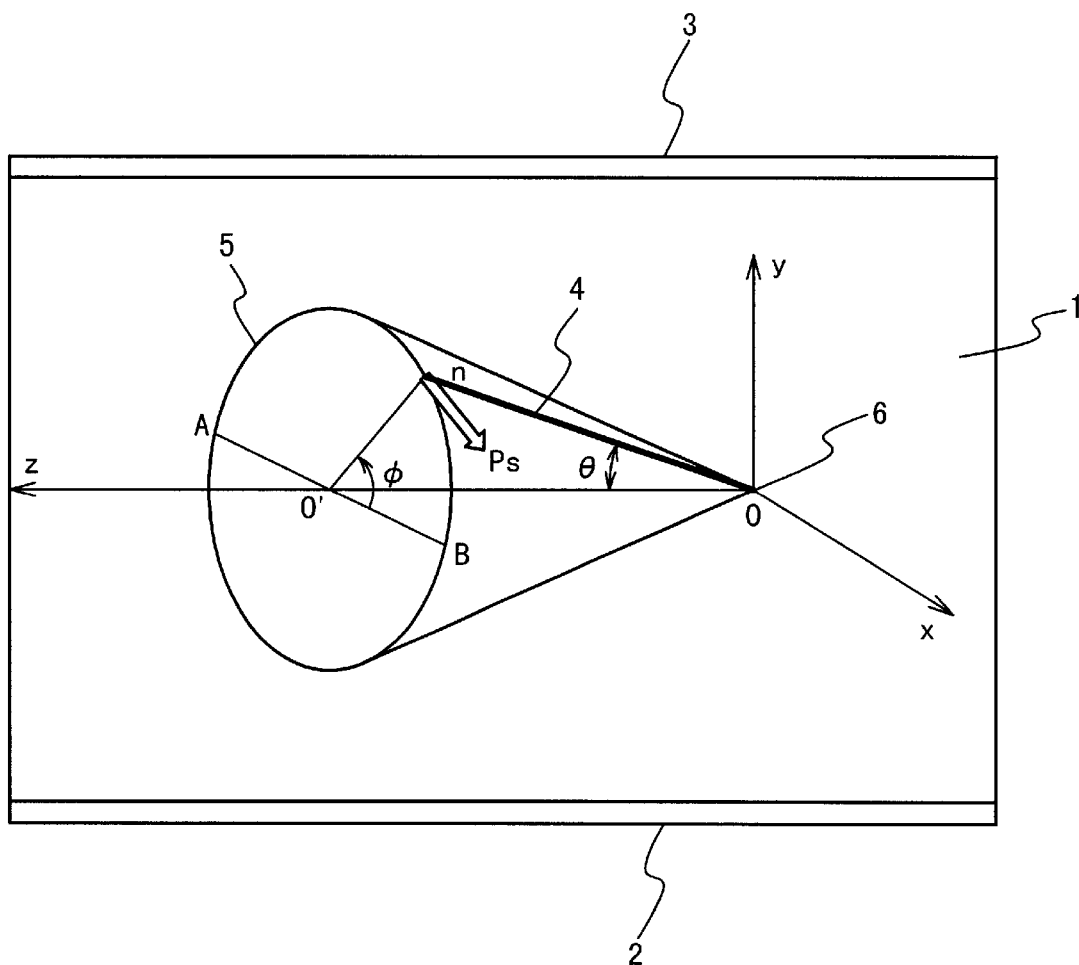
FIG. 4 shows an arrangement of liquid crystal molecules 4 included in a liquid crystal layer 1.

The liquid crystal layer 1 is provided with a smectic liquid crystal. The liquid crystal layer contains a liquid crystal molecule 4 as shown in FIG. 4. The liquid crystal molecule 4 is a rod-shaped molecule, and has a long axis and a short axis vertical to the long axis. The liquid crystal molecule 4 is rotated along a side of a cone 5 in accordance with an electric field applied, while an end of the liquid crystal molecule 4 is fixed to a vertex 6 of the cone 5. In FIG. 4, a position and an orientation of the liquid crystal molecule 4 are respectively represented by a position and an orientation of the long axis. Similarly in the following explanation, the position and the orientation of the liquid crystal molecule 4 are respectively represented by the position and the orientation of the long axis of the liquid crystal molecule 4.

The liquid crystal molecule 4 has a spontaneous polarization $P_s (>0)$ in a direction of the short axis. The spontaneous polarization $P_s$ is oriented in a tangential direction of a circle base of the cone 5.

Moreover, the liquid crystal molecule 4 has a dielectric constant $\epsilon_{//}$ in the direction of the long axis and a dielectric constant $\epsilon_\perp$ in the direction of the short axis. If a dielectric anisotropy $\Delta\epsilon$ is assumed to be represented by $\Delta\epsilon = \epsilon_{//} - \epsilon_\perp$:

$$\Delta\epsilon < 0. \quad (1)$$

Here, both $\epsilon_{//}$ and $\epsilon_\perp$ are permittivities in frequencies at which the spontaneous polarization $P_s$ does not correspond. That is, both $\epsilon_{//}$ and $\epsilon_\perp$, is derived from polarizations other than the spontaneous polarization $P_s$.

The spontaneous polarization $P_s$ of the liquid crystal molecule 4 is actively selected so as to be small. The facts that the dielectric anisotropy $\Delta\epsilon$ is negative and that the spontaneous polarization $P_s$ is actively selected so as to be small are of much importance in attaining the grayscale display while using the smectic liquid crystal.

The liquid crystal layer 1 contains a smectic liquid crystal having one or more kinds of spontaneous polarizations, a compound for adjusting a value of the spontaneous polarization $P_s$ and a compound for adjusting the dielectric anisotropy $\Delta\epsilon$. Moreover, the liquid crystal layer 1 may contain a compound for adjusting a temperature at which a phase transition of a liquid crystal is done, a compound for adjusting a helix pitch in a liquid crystal phase, a compound for adjusting a viscosity of a liquid crystal or a compound for adjusting a drive voltage.

The liquid crystal layer 1 is driven by the bottom substrate 2, and its light transmissivity is changed.

The bottom substrate 2 for driving the liquid crystal layer 1 contains a glass substrate 9. A silicon oxide film 10 is formed on the glass substrate 9. A TFT 11 is formed on the silicon oxide film 10. The TFT 11 contains a source 12, a channel area 13, a drain 14, a gate oxide film 15, a gate 16 and an LDD area 17. An inter-layer insulation film 18 is formed on the silicon oxide film 10 while covering the TFT 11. Contact holes 19, 20 are mounted in the inter-layer insulation film 18. Moreover, a source electrode 21 and a drain electrode 22 are mounted on the inter-layer insulation film 18. The source electrode 21 is connected through the contact hole 19 to the source 12. The drain electrode 22 is connected through the contact hole 20 to the drain 14. Moreover, an accumulation capacitor electrode 23 is mounted on the inter-layer insulation film 18. An inter-layer insulation film 24 is formed on the inter-layer insulation film 18 while covering the source electrode 21, the drain electrode 22 and the accumulation capacitor electrode 23.

Here, the accumulation capacitor electrode 23 and a lower ITO electrode 25 constitutes an accumulation capacitor 26. When the TFT 11 is turned on, the accumulation capacitor 26 is charged by the supply of a voltage from the source electrode 21. After that, when the TFT 11 is turned off, the accumulation capacitor 26 tries to maintain a potential of the lower ITO electrode 25 at its original state.

The bottom substrate 2 having the above-mentioned configuration is located opposite to the top substrate 3 through the liquid crystal layer 1.

The top substrate 3 is provided with a glass substrate 27, and an upper ITO electrode 28 mounted on the glass substrate 27. The upper ITO electrode 28 is in contact with the liquid crystal layer 1. An electrical field is applied between the lower ITO electrode 25 and the upper ITO electrode 28 to thereby drive the liquid crystal molecules 4 in the liquid crystal layer 1.

Here, both the accumulation capacitor electrode 23 and the upper ITO electrode 28 are grounded. Thus, a liquid crystal cell consisting of the lower ITO electrode 25, the upper ITO electrode 28, and the liquid crystal layer is connected in parallel to the accumulation capacitor 26.

Figure 5A:
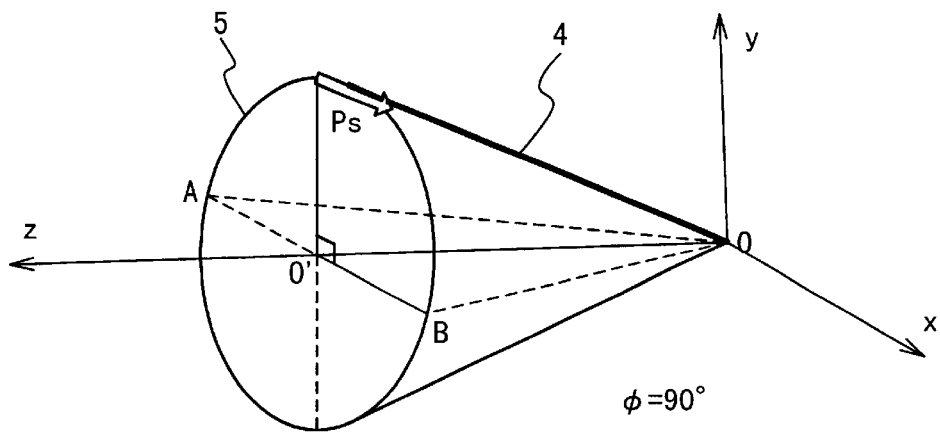
FIG. 5A shows an operation of a liquid crystal display in an embodiment according to the present invention.
Figure 5B:
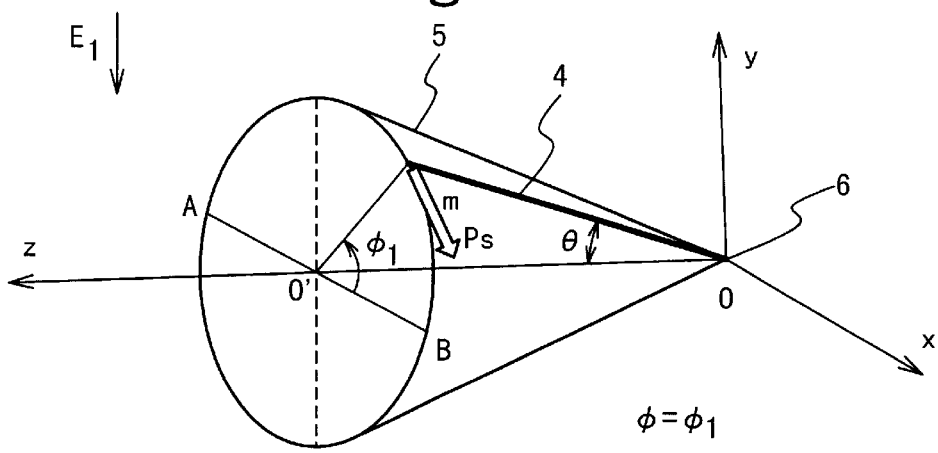
FIG. 5B shows an operation of a liquid crystal display in an embodiment according to the present invention.
Figure 5C:
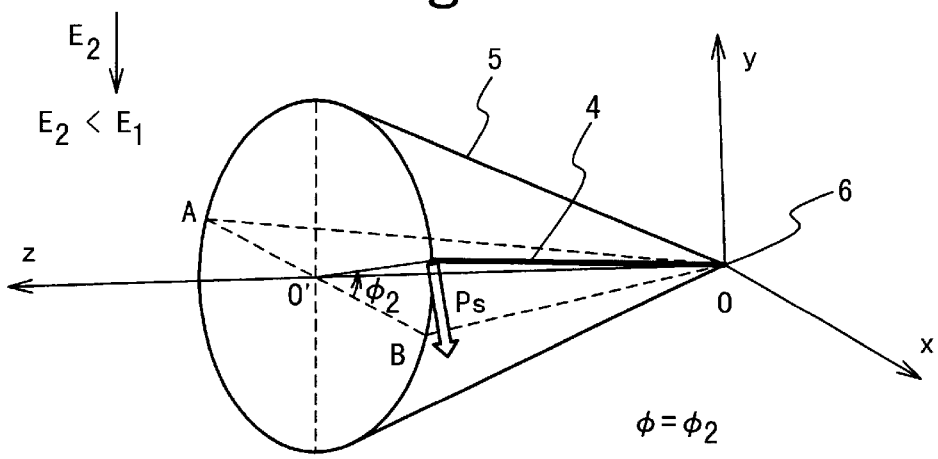
FIG. 5C shows an operation of a liquid crystal display in an embodiment according to the present invention.

In succession, the operations of the liquid crystal display in this embodiment are described. Symbols used in the explanation of the operations of the liquid crystal display in this embodiment are defined as follows. As shown in FIGS. 5A to 5C, the vertex 6 of the cone 5 is defined as an origin O of coordinates. A z-axis is established in a direction from the origin O toward a center O' of a circle base of the cone 5. A y-axis is established in a direction from the bottom substrate 2 toward the top substrate 3 and vertical to the top substrate 3. Also, an x-axis is established in a direction parallel to the bottom substrate 2 and the top substrate 3. Here, the x-axis, the y-axis and the z-axis are respectively established so as to generate a right hand system. Moreover, a point A and a point B are defined such that a line AB is a diameter of the circle on the bottom surface of the cone 5 and is established so as to be parallel to the x-axis. Moreover, an apex angle of the cone 5 is assumed to be $2\theta$. Moreover, a rotation angle $\phi$ of the liquid crystal molecule 4 is defined as $\angle PO'B$, when a certain position at another end of the liquid crystal molecule 4, which is not fixed to the vertex 6, is defined as a point P.

At an initial state, let us suppose that the voltage is not applied between the lower ITO electrode 25 and the upper ITO electrode 28. At this time, the electrical field is not applied to the liquid crystal layer 1. As shown in FIG. 5A, the liquid crystal molecule 4 included in the liquid crystal layer 1 is located within a flat plane vertical to the bottom substrate 2 and the top substrate 3. That is, the liquid crystal molecule 4 is located within a yz flat plane, and $\phi=90°$. At this time, the light transmissivity of the liquid crystal layer 1 is minimum. That is, the liquid crystal display in this embodiment is at a dark state.

In succession, let us suppose that the TFT 11 is turned on and then a voltage $V_1$ is applied between the lower ITO electrode 25 and the upper ITO electrode 28. That is, let us suppose that an electrical field $E_1$ is applied to the liquid crystal layer 1 in a -y-axis direction. In general, a liquid crystal molecule whose dielectric anisotropy $\Delta\epsilon$ is negative has the property that when an electrical field is applied, a short axis is oriented in a direction parallel to the applied electrical field and a long axis is oriented in a direction vertical to the applied electrical field. Thus, when the voltage $V_1$ is applied between the lower ITO electrode 25 and the upper ITO electrode 28 and then the electrical field $E_1$ is applied to the liquid crystal layer 1 in the y-axis direction, the liquid crystal molecule 4 is rotated along the side of the cone 5, in such a way that the long axis of the liquid crystal molecule 4 approaches further parallel to the bottom substrate 2 and the top substrate 3, as shown in FIG. 5B. That is, the rotation angle $\phi$ of the liquid crystal molecule 4 approaches 0° or 180°.

At this time, when the voltage $V_1$ is applied to the liquid crystal layer 1, the voltage $V_1$ is also applied to the accumulation capacitor 26 at the same time. The accumulation capacitor 26 is charged by the voltage $V_1$.

In succession, the TFT 11 is turned OFF. The slow response of the rotation of the liquid crystal molecule 4 to the application of the electrical field $E_1$ causes the TFT 11 to be turned OFF before the stabilization of the $\phi$ after the rotation of the liquid crystal molecule 4.

Immediately after the TFT 11 is turned off, the voltage $V_1$ is applied between the lower ITO electrode 25 and the upper ITO electrode 28 by the accumulation capacitor 26 charged by the voltage $V_1$. Accordingly, the electrical field continues to be applied to the liquid crystal layer 1, and the liquid crystal molecule 4 continues its rotation.

After an elapse of a certain time, the rotation of the liquid crystal molecule 4 is ended as shown in FIG. 5C. At this time, the spontaneous polarization $P_s$ of the liquid crystal molecule 4 is also rotated in conjunction with the rotation of the liquid crystal molecule 4. Thus, charges accumulated in the accumulation capacitor 26 flow out to thereby drop the voltage of the accumulation capacitor 26. That is, after the rotation of the liquid crystal molecule 4, the accumulation capacitor 26 maintains a voltage $V_2$ lower than the voltage $V_1$. A potential difference between the lower ITO electrode 25 and the upper ITO electrode 28 after the rotation of the liquid crystal molecule 4 is equal to the voltage $V_2$ held by the accumulation capacitor 26. Hence, after the rotation of the liquid crystal molecule 4, an electrical field $E_2=V_2/d_{1c}$ is applied to the liquid crystal layer 1. The application of the electrical field $E_2$ enables the liquid crystal layer 1 to be at a bright state at which the light transmissivity is large.

At this time, the rotation angle $\phi$ of the liquid crystal molecule 4 can be continuously changed in accordance with the electrical field $E_2$. The light transmissivity of the liquid crystal layer 1 depending on the rotation angle $\phi$ of the liquid crystal molecule 4 is continuously changed in accordance with the electrical field $E_2$. Thus, the liquid crystal display in this embodiment can attain the grayscale display.

In order to attain the grayscale display based on the above-mentioned principle, it is necessary that the dielectric anisotropy $\Delta\epsilon$ and the spontaneous polarization $P_s$ of the liquid crystal molecule 4 can satisfy the condition as calculated below.

The condition to be satisfied by the spontaneous polarization $P_s$ of the liquid crystal molecule 4 is determined depending on the condition with regard to a voltage change $\Delta V=|V_1-V_2|$ until the rotation of the liquid crystal molecule 4 is ended after the TFT 11 is turned OFF.

In order to enable the grayscale display, it is necessary that the voltage change $\Delta V$ is smaller than half of a potential difference $V_{diff}$ per a graylevel of the liquid crystal display. In a case of a liquid crystal display which has n graylevels and the maximum drive voltage of $V_{cc}$, the potential difference $V_{diff}$ is defined as $$V_{diff}=V_{cc}/n,$$

Therefore, $\Delta V$ should be smaller than $V_{cc}/2n$. This is because a difference between two graylevels adjacent to each other can not be recognized if the voltage change $\Delta V$ is greater than half the potential difference $V_{diff}$. In order to make the voltage change $\Delta V$ smaller than half the potential difference $V_{diff}$, namely, in order to enable the grayscale display, the condition required for the value of the spontaneous polarization $P_s$ of the liquid crystal molecule 4 is determined as follows.

As described above, the ITO electrode 25 and the accumulation capacitor electrode 23 constitute the accumulation capacitor 26. Moreover, the lower ITO electrode 25 and the upper ITO electrode 28 constitute the capacitor with the liquid crystal layer 1 as the dielectric substance. Here, a capacitance of the accumulation capacitor 26 is defined as $C_{sc}$. A component, to which the spontaneous polarization $P_s$ of the liquid crystal molecule 4 does not contribute, among the capacitance of the capacitor constituted by the lower ITO electrode 25 and the upper ITO electrode 28 is defined as $C_{1c}$.

At this time, as for the conditions immediately after the TFT 11 is turned OFF, and after the rotation of the liquid crystal molecule 4 is ended after the TFT 11 is turned OFF, the following equation is given from a charge conservation law:

$$(C_{1c}+C_{sc})\cdot V_1=(C_{1c}+C_{sc})\cdot V_2+P_s\cdot S_{pixel}(\cos\phi_2-\cos\phi_1). \quad (2)$$

Here, $P_s$ is the spontaneous polarization, $S_{pixel}$ is an area of a pixel, namely, an area of the lower ITO electrode 25, $\phi_1$ is a rotation angle of the liquid crystal molecule 4 immediately after the TFT 11 is turned OFF, and $\phi_2$ is a rotation angle of the liquid crystal molecule 4 after the end of the rotation of the liquid crystal molecule 4. As mentioned above, $V_1$ is the voltage applied to the liquid crystal layer 1 immediately after the TFT 11 is turned OFF, and $V_2$ is the voltage applied to the liquid crystal layer 1 after the end of the rotation of the liquid crystal molecule 4.

Also, the following equations are given:

$$C_{lc} = \varepsilon_0 \varepsilon_{lc} \frac{S_{pixel}}{d_{lc}}, \text{ and} \quad (3)$$

$$C_{lc} = \varepsilon_0 \varepsilon_{sc} \frac{S_{sc}}{d_{sc}}. \quad (4)$$

Here, $\epsilon_{1c}$ is a dielectric constant in the y-axis direction of the liquid crystal layer 1, at a frequency at which the orientation polarization caused by the spontaneous polarization $P_s$ of the liquid crystal molecule 4 does not correspond, and $d_{1c}$ is a distance between the bottom substrate 2 and the top substrate 3, namely, a distance between the lower ITO electrode 25 and the upper ITO electrode 28. $\epsilon_{sc}$ is a relative dielectric constant of the inter-layer insulation film 24, and $d_{sc}$ is a distance between the accumulation capacitor electrode 23 and the lower ITO electrode 25, and $S_{sc}$ is an area of the accumulation capacitor electrode 23.

That is, the voltage change $\Delta V$ $(=|V_1-V_2|)$ is calculated from the equations (2) to (4), as follows:

$$\Delta V = \left| \frac{P_s(\cos\phi_2 - \cos\phi_1)}{\varepsilon_0 \left( \frac{\varepsilon_{lc}}{d_{lc}} + \frac{\varepsilon_{sc} \cdot k}{d_{sc}} \right)} \right|. \quad (5)$$

Here, k is the ratio of the pixel area $S_{pixel}$ to the area $S_{sc}$ of the electrode of the accumulation capacitor 26 and $$S_{sc}=k\cdot S_{pixel}. \quad (6)$$

Here, let us consider that it is shifted from the dark state of $\phi=90°$ to $\phi=\phi_1$ since the TFT 11 is turned ON, and in succession, it is shifted to the bright state of $\phi=\phi_2$ since the TFT 11 is turned OFF. In this case, the worst case that the voltage change $\Delta V$ is maximum is the case that even if the TFT 11 is turned ON, the liquid crystal molecule 4 is not rotated at all, and after the TFT 11 is turned OFF, the liquid crystal molecule 4 is rotated, and $\phi=\phi_2$. That is, the case of $\phi_1=90°$ is the case that the voltage change $\Delta V$ is maximum.

On the other hand, $\phi_2$ satisfies $0 \leq \phi_2 \leq 90°$. That is, the worst case that the voltage change $\Delta V$ is maximum is the case of $\phi_2=0°$.

Thus, the maximum value $\Delta V_{max}$ of the voltage changes $\Delta V$ is calculated by substituting the $\phi_1=90°$ and the $\phi_2=0°$ into the equation (5), as follows:

$$\Delta V_{max} = \frac{P_s}{\varepsilon_0 \left( \frac{\varepsilon_{lc}}{d_{lc}} + \frac{\varepsilon_{sc} \cdot k}{d_{sc}} \right)}. \quad (7)$$

Thus, the liquid crystal display in which the grayscale display can be done is attained if the value of the spontaneous polarization $P_s$ of the liquid crystal molecule 4 is determined such that $$\Delta V_{max} < V_{diff}/2.$$

Therefore, the following equation is established:

$$P_s < \varepsilon_0 \left( \frac{\varepsilon_{lc}}{d_{lc}} + \frac{\varepsilon_{sc} \cdot k}{d_{sc}} \right) \cdot \frac{V_{diff}}{2}. \quad (8)$$

In a case of a liquid crystal display which has n graylevels and the maximum drive voltage of $V_{cc}$, because of $V_{diff}=V_{cc}/n$, the following equation is established:

$$P_s < \varepsilon_0 \left( \frac{\varepsilon_{lc}}{d_{lc}} + \frac{\varepsilon_{sc} \cdot k}{d_{sc}} \right) \cdot \frac{V_{cc}}{2n}. \quad (8')$$

Since the spontaneous polarization equation $P_s$ of the liquid crystal molecule 4 satisfies the equation (8) or (8'), the liquid crystal display in this embodiment can attain the grayscale display in the case of the shift from the dark state to the bright state. It is similarly possible in the case of the shift from the bright state to the dark state.

Moreover, let us consider that in the liquid crystal display in this embodiment, when the bright state is maintained by the application of the electrical field to the direction of the bottom substrate 2 from the top substrate 3, the electrical field is inverted from the top substrate 3 to the direction of the bottom substrate 2, the bright state is also maintained. This inversion is done in order to protect the liquid crystal display from being burned.

At this time, in the liquid crystal display which is maintained at the bright state of $\phi=\phi_0$ ($90° < \phi_0 \leq 180°$), when the TFT 11 is turned on, the electrical field is applied from the bottom substrate 2 to the direction of the top substrate 3, and then it becomes $\phi=\phi_1$ ($0° < \phi_1 \leq \phi_0$). In succession, when the TFT 11 is turned off, it is shifted to the bright state that $\phi=\phi_2$ ($0° \leq \phi_2 < 90°$).

In this case, the worst case that the voltage change $\Delta V$ is maximum is the case that even if the TFT 11 is turned ON, the liquid crystal molecule 4 is not rotated at all. Then, it becomes $\phi_1=\phi_0$, and then when the TFT 11 is turned off, the liquid crystal molecule 4 is rotated, and it becomes $\phi=\phi_2$.

Because it holds $90° < \phi_0 \leq 180°$ and $0 \leq \phi_2 < 90°$, the worst case that the voltage change $\Delta V$ is maximum is the case that $\phi_1=180°$ and $\phi_2=0°$.

Thus, by substituting $\phi_1=180°$ and $\phi_2=0°$ into the equation (5), the maximum value $\Delta V_{max}'$ of the voltage changes $\Delta V$ is calculated as follows:

$$\Delta V'_{max} = \frac{2P_s}{\varepsilon_0 \cdot \left(\frac{\varepsilon_{1c}}{d_{1c}} + \frac{\varepsilon_{sc} \cdot k}{d_{sc}}\right)}. \tag{9}$$

Hence, the range of the spontaneous polarization $P_s$ of the liquid crystal molecule 4 in which the grayscale display can be done is represented by:

$$P_s < \varepsilon_0 \cdot \left(\frac{\varepsilon_{1c}}{d_{1c}} + \frac{\varepsilon_{sc} \cdot k}{d_{sc}}\right) \cdot \frac{V_{cc}}{4n}. \tag{10}$$

The spontaneous polarization $P_s$ of the liquid crystal molecule 4 satisfies the equation (10). Thus, even if the applied electrical field is inverted in order to avoid the liquid crystal display from being burned, the grayscale display can be attained.

In succession, the condition required for the dielectric anisotropy $\Delta\epsilon$ is determined as follows. From the above-mentioned principle, it is necessary that the magnitude $T_E$ of a torque induced in the liquid crystal molecule 4 caused by a coupling the dielectric anisotropy $\Delta\epsilon$ to the electrical field applied should be stronger than the magnitude $T_P$ of a torque induced in the liquid crystal molecule 4 caused by a coupling of the spontaneous polarization $P_s$ to the electrical field applied.

The magnitude $T_E$ of the torque caused by the coupling of the dielectric anisotropy $\Delta\epsilon$ to the electrical field applied is represented by:

$$T_E = |\epsilon_0 \cdot \Delta\epsilon \cdot E_{eff} \sin^2\theta \cdot \sin\phi \cdot \cos\phi|. \tag{11}$$

And, the magnitude $T_P$ of the torque induced in the liquid crystal molecule 4 caused by the coupling of the spontaneous polarization $P_s$ to the electrical field applied is represented by:

$$T_P = |P_s E_{eff} \sin\phi| \tag{12}$$

Here, $E_{eff}$ is an effective electric field which is effective inside the liquid crystal layer 1.

It should be noted that the $E_{eff}$ is not the external electrical field applied to the liquid crystal layer 1. Conventionally, it is considered that the external electrical field determines the magnitude $T_E$ of the torque induced in the liquid crystal molecule 4 caused by the coupling of the dielectric anisotropy $\Delta\epsilon$ to the electrical field and the magnitude $T_P$ of the torque caused by the coupling of the spontaneous polarization $P_s$ to the electrical field. However, we discovered the effect that the external electrical field applied to the liquid crystal layer 1 from the external portion is cancelled out by the electrical field generated by the spontaneous polarization $P_s$, and we find out that the effect must be considered. Therefore, we have calculated the $T_E$ and the $T_P$ by considering that effect.

The effective electrical field $E_{eff}$ is determined as follows. A dielectric flux density D in the direction vertical to the top electrode 3 and the bottom electrode 2 in the liquid crystal layer 1 is represented by:

$$D = \epsilon_0 E + P_1 + P_2. \tag{13}$$

Here, $P_1$ is a component in the direction vertical to the bottom substrate 2 and the top substrate 3 of the polarization at the frequency at which the spontaneous polarization $P_s$ does not correspond, and $P_2$ is a component in the direction vertical to the bottom substrate 2 and the top substrate 3 of the orientation polarization caused by the spontaneous polarization $P_s$, and E is the external electrical field applied to the liquid crystal layer 1.

Here, when $\epsilon_{1c}$ is assumed to be a relative dielectric constant in the direction vertical to the bottom substrate 2 and the top substrate 3, at the frequency at which the spontaneous polarization $P_s$ does not correspond, the following equation is established:

$$\epsilon_0 \epsilon_{1c} E = \epsilon_0 \cdot E + P_1. \tag{14}$$

From the equations (13) and (14), the following equation is established:

$$E_{eff} = \frac{D}{\varepsilon_0 \varepsilon_{1c}} \tag{15}$$
$$= E + \frac{P_2}{\varepsilon_0 \varepsilon_{1c}}.$$

Since $P_2$ is the component in the direction vertical to the top electrode 3 and the bottom electrode 2, in the spontaneous polarization $P_s$ of the liquid crystal molecule 4, it holds:

$$P_2 = P_s \cdot \cos\phi. \tag{16}$$

From the equations (15) and (16), the effective electrical field $E_{eff}$ is represented by:

$$E_{eff} = E + \frac{P_s \cos\phi}{\varepsilon_0 \varepsilon_{1c}}. \tag{17}$$

The magnitude $T_E$ of the torque caused by the coupling of the dielectric anisotropy $\Delta\epsilon$ to the effective electrical field should be greater than the magnitude $T_P$ of the torque caused by the mutual action between the electrical field and the spontaneous polarization $P_s$ of the liquid crystal molecule 4, namely, $T_P < T_E$. Thus, it holds:

$$|P_s E_{eff} \sin\phi| < |\epsilon_0 \cdot \Delta\epsilon \cdot E_{eff} \sin^2\theta \cdot \sin\phi \cdot \cos\phi| \tag{18}$$

Namely:

$$|\Delta\varepsilon| > \left|\frac{P_s}{\varepsilon_0 \cdot E_{\mathit{eff}} \cdot \sin^2\theta \cdot \cos\phi}\right| \quad (19)$$

By substituting the equation (17) into the equation (19), the following equation is $$|\Delta\varepsilon| > \left|\frac{P_s}{\varepsilon_0 \cdot \left(E + \frac{P_s \cos\phi}{\varepsilon_0 \varepsilon_{1c}}\right) \cdot \sin^2\theta \cdot \cos\phi}\right| \quad (20)$$

In the liquid crystal display in this embodiment, the dielectric anisotropy $\Delta\epsilon$ is selected so as to satisfy the equation (20).

When the liquid crystal layer 1 has the chevron structure, the equation (11) and (12) should be modified. In this case, the liquid crystal layer 1 is formed with a plurality of smectic layers which are mutually tilted.

With a layer inclination angle accomplished by neighboring two of the plurality of smectic layers represented as $\delta$, the equations (11) and (12) are modified as follows:

$$T_E = \left|\varepsilon_0 \cdot \Delta\varepsilon \cdot E_{\mathit{eff}}^2 \cdot \left(\sin^2\theta \cdot \cos^2\delta \sin\phi \cdot \cos\phi + \frac{1}{4}\sin 2\theta \sin 2\delta \cos\phi\right)\right|, \quad (11')$$

and $$T_P = |P_s E_{\mathit{eff}} \cos\delta \sin\phi|. \quad (12')$$

From the $T_E > T_P$ and the equation (17), the following equation is established:

$$|\Delta\varepsilon| > \frac{P_s}{\varepsilon_0 \cdot \left(E + \frac{P_s \cos\phi}{\varepsilon_{1c}}\right) \cdot \left(\sin^2\theta \cdot \cos\delta \cdot \cos\phi + \frac{\sin 2\theta \cdot \sin\delta}{2\tan\phi}\right)}. \quad (20')$$

If the liquid crystal layer 1 has the chevron structure, the dielectric anisotropy $\Delta\epsilon$ of the liquid crystal molecule 4 is selected such that $\Delta\epsilon < 0$ and it satisfies the equation (20)'.

In succession, the fact that the liquid crystal display in this embodiment can attain the grayscale display is proved by using the following equations.

The liquid crystal molecule 4 in the liquid crystal layer 1 is moved within the side of the cone 5 in accordance with a motion equation introduced by Xue Jiu-zhi et. al., namely:

$$\eta \frac{\partial \phi}{\partial t} = P_s \cdot E_{\mathit{eff}} \cdot \sin\phi + \varepsilon_0 \cdot \Delta\varepsilon \cdot E_{\mathit{eff}}^2 \cdot \sin^2\theta \cdot \sin\phi \cdot \cos\phi. \quad (21)$$

Here, $\eta$ is a viscosity coefficient of the liquid crystal layer 1, and $E_{\mathit{eff}}$ is the effective electrical field applied to the direction vertical to the top electrode 3 and the bottom electrode 2 within the liquid crystal layer 1, as mentioned above. The effective electrical field $E_{\mathit{eff}}$ is calculated from the equation (17). Also, t is a time, and $\epsilon_0$ is a permittivity of vacuum.

The substitution of the equation (17) into the equation (21) enables the calculation of the degree of a temporal correspondence with regard to an electrical field E applied from the external portion which $\phi$ indicating the motion of the liquid crystal molecule 4 provides. Moreover, the light transmissivity of the liquid crystal layer 1 can be calculated in accordance with $\phi$. That is, the temporal correspondence of the light transmissivity of the liquid crystal layer 1 can be calculated from the equations (17) and (21).

Figure 6:
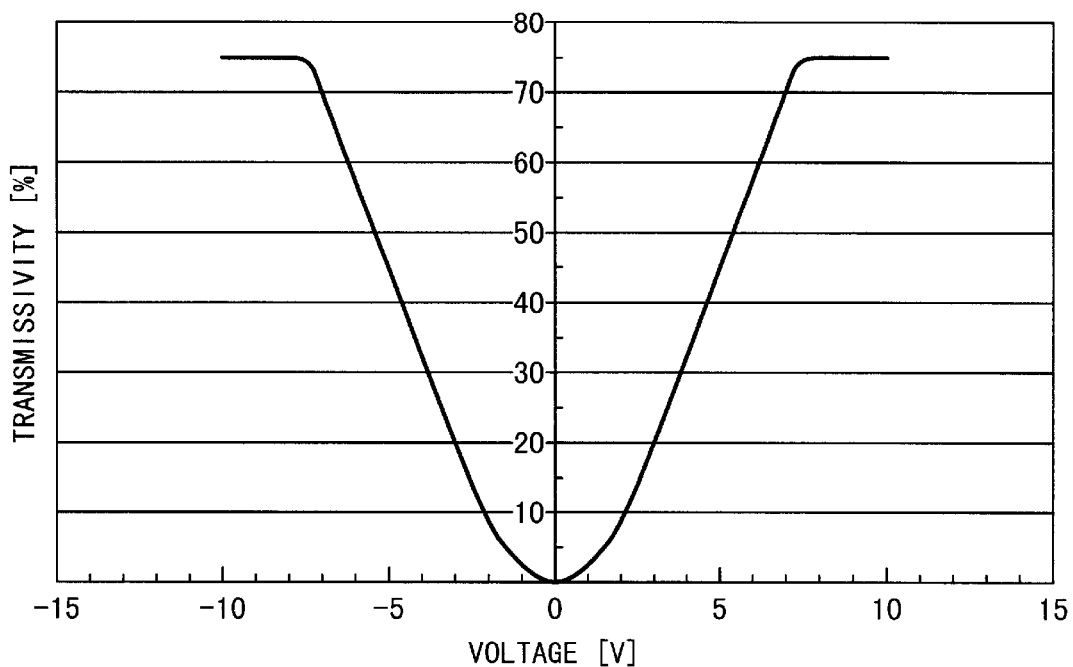
FIG. 6 shows a voltage-to-transmissivity property of a liquid crystal display in an embodiment according to the present invention.

FIG. 6 shows a voltage-to-transmissivity property of the liquid crystal layer 1, when a triangular wave voltage having a frequency of 1 Hz and an amplitude of ±10V is applied to the liquid crystal layer 1. As shown in FIG. 6, the liquid crystal layer 1 provides a voltage-to-transmissivity property which is V-shaped and has a minimum value of a voltage of 0V.

Figure 7:
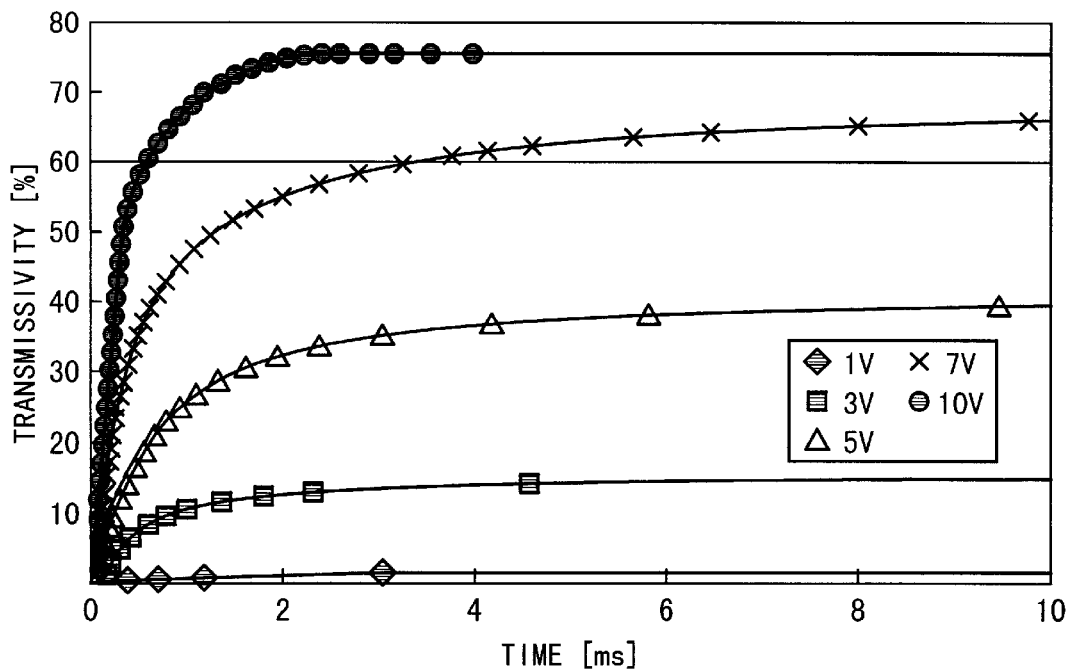
FIG. 7 shows a transmissivity-to-time property of a liquid crystal display in an embodiment according to the present invention.

FIG. 7 shows a temporal correspondence of a light transmissivity of the liquid crystal layer 1, when the voltages of 1V, 3V, 5V, 7V and 10V are respectively applied to the liquid crystal layer 1. As shown in FIG. 7, the liquid crystal layer 1 is stabilized at the light transmissivity different for each voltage. As mentioned above, the liquid crystal display in this embodiment can carry out the continuous grayscale display.

Moreover, The small spontaneous polarization $P_s$ prevent the liquid crystal display from a occurrence of the step response. The spontaneous polarization $P_s$ is actively selected so as to be small. That is, the liquid crystal display in this embodiment does not require the reset drive and the comparison calculation between the frames. The fact that the spontaneous polarization $P_s$ of the liquid crystal molecule 4 is actively selected so as to be small suppresses the above-mentioned voltage change $\Delta V$.

Figure 8:
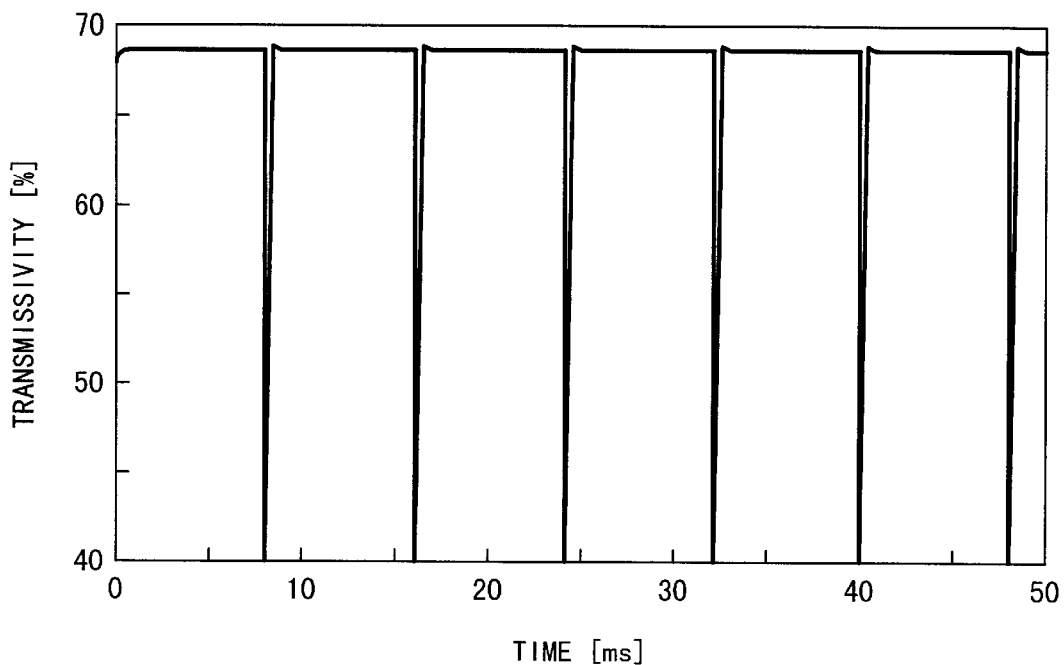
FIG. 8 shows a transmissivity-to-time property in the liquid crystal layer 1 when a rectangular pulse is applied to the liquid crystal layer 1 of the liquid crystal display in the embodiment according to the present invention.

FIG. 8 shows a temporal change of a transmissivity, when a rectangular pulse having a constant amplitude is applied to the liquid crystal layer 1 in this embodiment, intermittently at a period of 8 ms. The period of the rectangular pulse is referred to as a field.

Here, as the liquid crystal layer 1, the liquid crystal material is used in which the spontaneous polarization $P_s$ is 1 (nC/cm2). Moreover, the shapes and the positions of the accumulation capacitor electrode 23 and the lower ITO electrode 25 are determined so as to set $C_{sc} > 4 C_{1c}$. Here, a capacitance of the accumulation capacitor 26 is defined as $C_{sc}$, and a component, to which the spontaneous polarization $P_s$ of the liquid crystal molecule 4 does not contribute, among the capacitance of the capacitor constituted by the lower ITO electrode 25 and the upper ITO electrode 28 is defined as $C_{1c}$.

As shown in FIG. 8, in each field, the liquid crystal layer 1 is stabilized after the achievement of the substantially same transmissivity. There is no substantially temporal change in the transmissivity of the liquid crystal layer 1. Thus, in the liquid crystal display in this embodiment, the step response is difficult to be induced. Hence, it does not require the reset drive and the comparison calculation between the frames.

Figure 9:
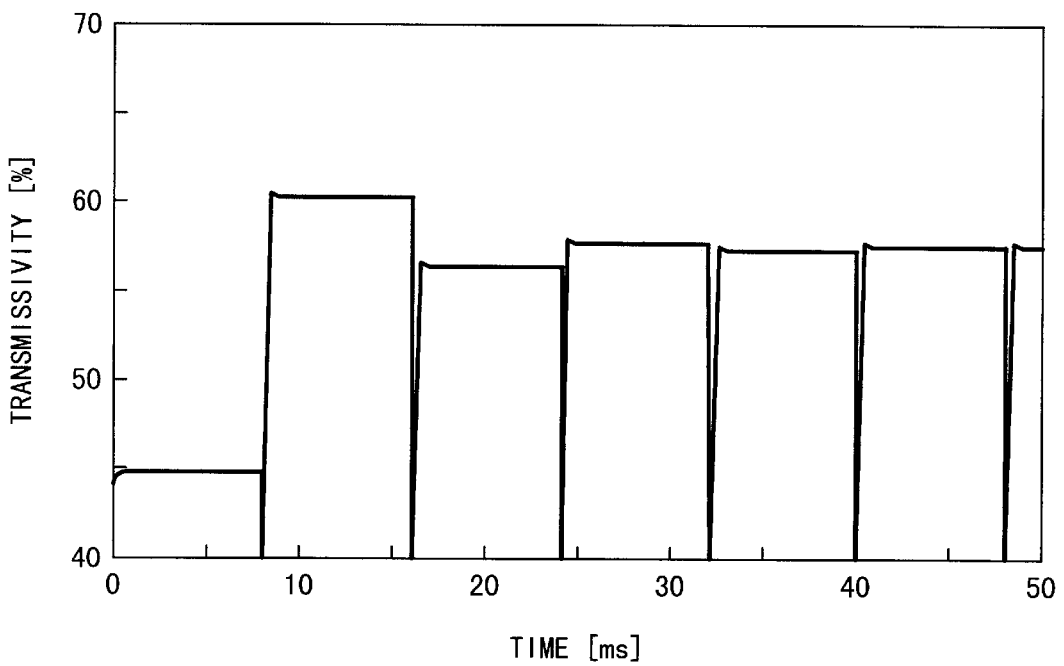
FIG. 9 shows a transmissivity-to-time property of a liquid crystal display having a configuration in which the liquid crystal layer 1 of the liquid crystal display in the embodiment according to the present invention is replaced by a liquid crystal material in which a spontaneous polarization is 20 (nC/cm2).

On the other hand, FIG. 9 shows a temporal change of a transmissivity, when a liquid crystal material in which the spontaneous polarization $P_s$ is 20 (nC/cm2) is used as the liquid crystal layer 1 of the liquid crystal display in this embodiment. As shown in FIG. 10, five fields are required for the stabilization of the transmissivity. That is, the step response is induced. It is understood that if the spontaneous polarization $P_s$ is large, the step response is easily induced.

Moreover, the liquid crystal display, in which the step response is further difficult to be induced, can be attained by making the capacitance $C_{sc}$ of the accumulation capacitor 26 equal to or greater than 10 times the $C_{1c}$.

In this embodiment, the liquid crystal material constituting the liquid crystal layer 1 may be the DHF liquid crystal material, supposing that it satisfies the above-mentioned conditions.

Moreover, in this embodiment, the liquid crystal material constituting the liquid crystal layer 1 may be the polymer stabilized FLC, supposing that it satisfies the above-mentioned conditions.

Furthermore, in this embodiment, the liquid crystal material constituting the liquid crystal layer 1, supposing that it satisfies the above-mentioned conditions may be a smectic liquid crystal material which has a chiral-smectic C phase. In this case, the liquid crystal molecule 4 is mono-stabilized in an initial state such that a projection component to the substrate 2 and 3 of the long axis of the liquid crystal molecule 4 and a projection component of a rotation axis of the cone 5 are respectively equal to a orientation process direction of the substrate 2 and 3. Here, the orientation process may mean rubbing the surface of the substrate 2 and 3 to make the liquid crystal molecule 4 oriented to a certain direction.

Also, the liquid crystal material constituting the liquid crystal layer 1 may be formed of a ferroelectric liquid crystal material having an isotropic phase, a chiral smectic phase and a smectic C* phase. In this case, the liquid crystal material constituting the liquid crystal layer 1 is mono-stabilized in an initial state while a phase transition from the chiral smectic phase to the smectic C* phase is done.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A liquid crystal display comprising:
   a liquid crystal layer including a liquid crystal molecule having:
   a long axis;
   a short axis perpendicular to said long axis;
   a spontaneous polarization $P_s$ along said short axis;
   a first permittivity $\epsilon_{//}$ along said long molecular axis;
   a second permittivity $\epsilon_\perp$ along said short axis, wherein said second permittivity $\epsilon_{TM}$ is derived from polarizations other than said spontaneous polarization, and
   wherein a permittivity anisotropy $\epsilon\epsilon$ defined as $$\Delta\epsilon=\epsilon_{//}-\epsilon_\perp$$

has a value of $$\Delta\epsilon<0,$$

and
   wherein an orientation of said liquid crystal molecule is determined by an effective electric field which is a sum of an exterior electric field applied to said liquid crystal layer and a depolarization field generated by said spontaneous polarization.

2. A liquid crystal display according to claim 1, further comprising a first pair of electrodes between which said liquid crystal layer is located, wherein said first pair of electrodes and said liquid crystal layer constitute a liquid crystal cell, and
   wherein said spontaneous polarization $P_s$ is determined as $$\Delta V<V_{cc}/2n,$$

where $\Delta V$ is a change in a voltage between said first pair of electrodes caused by a reverse of said spontaneous polarization $P_s$ after charging of said first pair of electrodes to a charging voltage is finished, and $V_{cc}$ is a maximum driving voltage applied to said first pair of electrodes, and n is a number of graylevels of said liquid crystal display.

3. A liquid crystal display according to claim 2, further comprising a storage capacitor including:
   a second pair of electrodes; and
   a insulating layer between said second pair of electrodes, wherein said storage capacitor is connected to said liquid crystal cell in parallel, and said spontaneous polarization $P_s$ has a value of $$0 < P_s < \varepsilon_0\left(\frac{\varepsilon_{lc}}{d_{lc}} + \frac{\varepsilon_{sc}\cdot k}{d_{sc}}\right)\cdot\frac{V_{cc}}{2n}$$

where $\epsilon_0$ is a permittivity of vacuum, and $\epsilon_{1c}$ is a permittivity of said liquid crystal layer in a same direction of said external electric field, $d_{1c}$ is a first distance between said pair of electrodes, and $\epsilon_{sc}$ is a permittivity of said insulating layer, and $d_{sc}$ is a second distance between said other pair of electrodes, and k has a value of $$k=S_{sc}/S_{1c}$$

where $S_{1c}$ is an aperture of each of said first pair of electrodes and $S_{sc}$ is an aperture of each of said second pair of electrodes.

4. A liquid crystal display according to claim 2, wherein said spontaneous polarization $P_s$ has a value of $$0 < P_s < \varepsilon_0\left(\frac{\varepsilon_{lc}}{d_{lc}} + \frac{\varepsilon_{sc}\cdot k}{d_{sc}}\right)\cdot\frac{V_{cc}}{4n}.$$

5. A liquid crystal display according to claim 1, wherein a first torque applied to said liquid crystal molecule and generated by coupling of a permittivity anisotropy of said liquid crystal molecule to said effective electric field is larger than a second torque applied to said liquid crystal molecule and generated by coupling of said spontaneous polarization to said effective electric field.

6. A liquid crystal display according to claim 5, further comprising a first pair of electrodes between which said liquid crystal layer is located, wherein said first pair of electrodes and said liquid crystal layer constitute a liquid crystal cell, and
   wherein said spontaneous polarization $P_s$ is determined such that $$\Delta V<V_{cc}/2n,$$

where $\Delta V$ is a change in a voltage between said first pair of electrodes caused by a reverse of said spontaneous polarization $P_s$ after charging of said first pair of electrodes to a charging voltage is finished, and $V_{cc}$ is a maximum driving voltage applied to said first pair of electrodes, and n is a number of graylevels of said liquid crystal display.

7. A liquid crystal display according to claim 6, further comprising a storage capacitor including:
   a second pair of electrodes; and
   an insulating layer between said second pair of electrodes, wherein said storage capacitor is connected to said liquid crystal cell in parallel, and
   wherein said spontaneous polarization $P_s$ has a value of $$0 < P_s < \varepsilon_0\left(\frac{\varepsilon_{lc}}{d_{lc}} + \frac{\varepsilon_{sc}\cdot k}{d_{sc}}\right)\cdot\frac{V_{cc}}{2n}$$

where $\epsilon_0$ is a permittivity of vacuum, and $\epsilon_{1c}$ is a permittivity of said liquid crystal layer in a same direction of said external electric field, $d_{1c}$ is a first distance between said pair of electrodes, and $\epsilon_{sc}$ is a permittivity of said insulating layer, and $d_{sc}$ is a second distance between said other pair of electrodes, and k has a value of $$k = S_{cc}/S_{1c}$$

where $S_{1c}$ is an aperture of each of said first pair of electrodes and $S_{1c}$ is an aperture of each of said second pair of electrodes.

8. A liquid crystal display according to claim 7, wherein said spontaneous polarization $P_s$ has a value of $$0 < P_s < \varepsilon_0 \left( \frac{\varepsilon_{lc}}{d_{lc}} + \frac{\varepsilon_{sc} \cdot k}{d_{sc}} \right) \cdot \frac{V_{cc}}{4n}.$$

9. A liquid crystal display according to claim 1, further comprising a first pair of electrodes between which said liquid crystal layer is located, wherein said liquid crystal molecule lies on a surface of a cone having an apical angle of 2θ and one of ends of said liquid crystal molecule is fixed on a vertex of said cone and the other end of said liquid crystal is rotated along a circular base of said cone, and a perpendicular from said vertex to said circular base is generally parallel to said pair of electrodes, and wherein said permittivity anisotropy Δε has a value of $$|\Delta \varepsilon| > \frac{P_s}{\varepsilon_0 \cdot \left( E + \frac{P_s \cos\phi}{\varepsilon_0 \varepsilon_{lc}} \right) \cdot \sin^2\theta \cdot \cos\phi}$$

where E is an amplitude of said exterior electric field, $\epsilon_{1c}$ is a permittivity of said liquid crystal layer in a same direction of said external electric field, φ is an azimuthal angle accomplished by a first segment and a second segment, and said first segment is directed in a radius direction of said circular base and in parallel to said first pair of electrodes, and said second segment links said other end of said liquid crystal molecule and a center of said circular base of said cone.

10. A liquid crystal display according to claim 1, further comprising a first pair of electrodes between which said liquid crystal layer is located, wherein said liquid crystal layer has a chevron structure including a plurality of smectic layers, and wherein said liquid crystal molecule lies on a surface of a cone having an apical angle of 2θ and one of ends of said liquid crystal molecule is fixed on a vertex of said cone and the other end of said liquid crystal is rotated along a circular base of said cone, and a perpendicular from said vertex to said circular base is generally parallel to said pair of electrodes, and wherein said permittivity anisotropy Δε has a value of $$|\Delta \varepsilon| > \frac{P_s}{\varepsilon_0 \cdot \left( E + \frac{P_s \cos\phi}{\varepsilon_{lc}} \right) \cdot \left( \sin^2\theta \cdot \cos\delta \cdot \cos\phi + \frac{\sin 2\theta \cdot \sin\delta}{2\tan\phi} \right)}$$

where E is an amplitude of said exterior electric field, $\epsilon_{1c}$ is a permittivity of said liquid crystal layer in a same direction of said external electric field, φ is an azimuthal angle accomplished by a first segment and a second segment, and said first segment is directed in a radius direction of said circular base and in parallel to said first pair of electrodes, and said second segment links said other end of said liquid crystal molecule and a center of said circular base of said cone, and δ is an angle accomplished by neighboring two of said plurality of smectic layers.

11. A liquid crystal display according to claim 1, wherein a liquid crystal layer is formed of a smectic liquid crystal material which is a DHF (Deformed Helix Ferroelectric) liquid crystal material.

12. A liquid crystal display according to claim 1, wherein a liquid crystal layer is formed of a smectic liquid crystal material which is a polymer stabilized ferroelectric liquid crystal material.

13. A liquid crystal display according to claim 1, further comprising a first pair of electrodes between which said liquid crystal layer is located, wherein said liquid crystal layer has a chiral-smectic C phase, and said liquid crystal molecule is mono-stabilized in an initial state such that a first projection component to said first pair of electrodes of said long axis and a second projection component to said first pair of electrodes of a rotation axis of a cone drawn by said liquid crystal molecule are respectively equal to a orientation process direction of said first pair of electrodes.

14. A liquid crystal display according to claim 1, wherein said liquid crystal layer consists of a ferroelectric liquid crystal material having an isotropic phase, a chiral-smectic phase, and a smectic C* phase and mono-stabilized in an initial state while a phase transition from said chiral smectic phase to said smectic C* phase is done.

15. A method of operating a liquid crystal display including a liquid crystal molecule comprising:

applying an external electric field to said liquid crystal molecule;

generating a depolarization field opposite to said electric field by reversing a spontaneous polarization of said liquid crystal molecule to produce an effective electric field which is sum of said external electric field and said depolarization field;

applying to said liquid crystal molecule a torque generated by a coupling of a permittivity anisotropy of said liquid crystal molecules to said effective electric field; and settling an orientation of said liquid crystal molecule, wherein said orientation is determined by an effective electric field.

16. A method according to claim 15, wherein said liquid crystal molecule has:

a long axis;

a short axis perpendicular to said long axis;

a spontaneous polarization $P_s$ along said short axis;

a first permittivity $\epsilon_{//}$ along said long molecular axis;

a second permittivity $\epsilon_\perp$ along said short axis in which a contribution of said spontaneous polarization is excluded, and wherein a permittivity anisotropy Δε defined as $$\Delta\varepsilon = \varepsilon_{//} - \varepsilon_\perp$$

has a value of $$\Delta\varepsilon < 0.$$

17. A method according to claim 16, wherein said liquid crystal molecule is contained in a liquid crystal layer which is located between a first pair of electrodes, and wherein said spontaneous polarization $P_s$ is determined such that $$\Delta V < V_{cc}/2n,$$

where ΔV is a change in a voltage between said first pair of electrodes caused by said generating said depolarization field of said spontaneous polarization $P_s$ after said applying said external electric field is finished, and $V_{cc}$ is a maximum driving voltage applied to said first pair of electrodes, and n is a number of graylevels of said liquid crystal display.

18. A method according to claim 16, wherein said torque generated by a coupling of a permittivity anisotropy of said liquid crystal molecules to said effective electric field is larger than another torque applied to said liquid crystal molecules generated by a coupling of said spontaneous polarization to said effective electric field.

19. A liquid crystal comprising:

a liquid crystal molecule which has:

a long axis;

a short axis perpendicular to said long axis;

a spontaneous polarization $P_s$ along said short axis;

a first permittivity $\epsilon_{//}$ along said long molecular axis; and a second permittivity $\epsilon_\perp$ along said short axis wherein, wherein said second permittivity is derived from polarizations other than said spontaneous polarization, and wherein a permittivity anisotropy $\Delta\epsilon$ defined as $$\Delta\epsilon = \epsilon_{//} - \epsilon_\perp$$

has a value of $$\Delta\epsilon < 0,$$

and wherein a direction of said long axis is determined by an effective electric field which is a sum of an exterior electric field applied to said liquid crystal and a depolarization field caused by said spontaneous polarization.

20. A liquid crystal according to claim 19, wherein a liquid crystal layer is formed of a smectic liquid crystal material which is a DHF (Deformed Helix Ferroelectric) liquid crystal material.

21. A liquid crystal according to claim 19, wherein a liquid crystal layer is formed of a smectic liquid crystal material which is a polymer stabilized ferroelectric liquid crystal material.

22. A liquid crystal according to claim 19, wherein said liquid crystal layer consists of a ferroelectric liquid crystal material having an isotropic phase, a chiral-smectic phase, and a smectic C* phase and mono-stabilized in an initial state while a phase transition from said chiral smectic phase to said smectic C* phase is done.

* * * * *